3,819,666
PERFLUOROALKYL CARBOXYLIC ACIDS
Eduard K. Kleiner, New York, and Robert A. Falk, New City, N.Y., assignors to Ciba-Geigy Corporation, Ardsley, N.Y.
No Drawing. Filed Aug. 16, 1972, Ser. No. 281,085
Int. Cl. C08h 3/00
U.S. Cl. 260—402.5     4 Claims

ABSTRACT OF THE DISCLOSURE

Novel perfluoroalkyl group containing acids and esters or anhydrides thereof are disclosed with utility as intermediates for the synthesis of polymers or salts such as chromium complexes having oil and water repellent properties. The novel acids are obtained by the addition of mercapto acids to perfluoroalkyl group containing esters of fumaric, maleic, citraconic, mesaconic, itaconic, methylene malonic or aconitic acids.

---

This invention is directed to novel perfluoroalkyl group containing acids. Additionally esters and anhydrides of these novel acids are disclosed. These compounds are useful in preparing polymers or salts such as chromium complexes which possess oil and water repellent properties.

The novel perfluoroalkyl group containing acids have the following general structure:

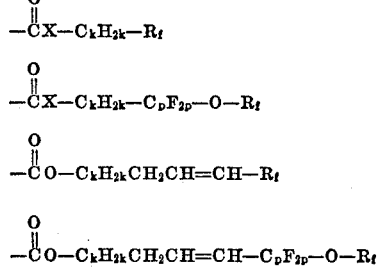

wherein $R^1$, $R^2$ and $R^3$ are hydrogen, methyl, $R_fA$ or $R_fACH_2$ with the requirement that at least one or two of $R^1$, $R^2$ and $R^3$ represent $R_fA$ or $R_2ACH_2$;

$R_f$ is a perfluoroalkyl group of 1 to 18 carbon atoms and more preferably 6 to 12 carbon atoms;

$AR_f$ is

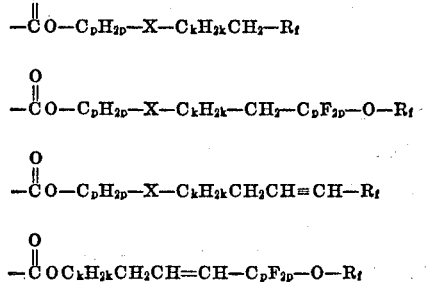

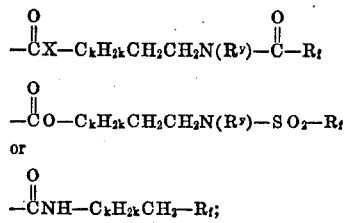

X is oxygen or sulfur;
k is zero to 10;
p is 2 to 12;
$R^y$ is hydrogen or alkyl of 1 to 4 carbon atoms;
m=1 or 2;

B is an inert linkage group, a diradical in the case that m equals 1, and a triradical if m equals 2, with 1 to 18 carbon atoms, and preferably 1 or 2 carbon atoms, i.e.

$$-CH_2-, \quad -CH_2CH_2-, \quad -CH(CH_3)-, \quad \underset{\underset{CH_2-}{|}}{-CH-}$$

A suitable method for forming the novel acids of formula I, involves a base or free radical catalyzed addition reaction of α, β-unsaturated di- or triesters of the formula:

II     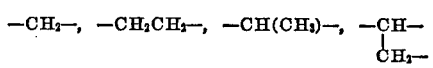

to mercapto acids of the formula

III     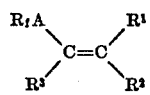

In formulas II and III the substituents have been defined previously.

The type of esters of formula II which may be employed are derived from fumaric, maleic, citraconic, mesaconic, itaconic, methylene malonic and aconitic acids. The formula II esters are defined to be:

| Type ester | $R^1$ | $R^2$ | $R^3$ |
|---|---|---|---|
| Fumarate | —H | —$AR_f$ | —H |
| Maleate | —$AR_f$ | —H | —H |
| Mesaconate | —H | —$AR_f$ | —$CH_3$ |
| Citraconate | —$AR_f$ | —H | —$CH_3$ |
| Itaconate | —H | —H | —$CH_2AR_f$ |
| Methylene malonate | —H | —H | —$AR_f$ |
| cis-Actonitate | —H | —$AR_f$ | —$CH_2AR_f$ |
| trans-Acronitate | —$AR_f$ | —H | —$CH_2AR_f$ |

Esters of type II are described in the following applications assigned to the assignee of the present invention: Ser. No. 720,370 filed Apr. 10, 1968, in the names of Eduard K. Kleiner and Martin Knell; Ser. No. 732,040 filed May 27, 1968, in the names of Eduard K. Kleiner, Martin Knell and Pier Luigi Pacini; Ser. No. 812,439, filed Apr. 1, 1969, in the name of Eduard K. Kleiner; Ser. No. 820,647, filed Apr. 30, 1969, in the name of Eduard K. Kleiner; and Ser. No. 833,706, filed June 16, 1969, in the names of Eduard K. Kleiner and Pier Luigi Pacini, and the copending applications Ser. No. 199,793 and Ser. No. 199,794 both filed on Nov. 11, 1971, in the names of Eduard K. Kleiner and Martin Knell.

The disclosure of these copending applications for the preparation of the starting esters and the related subject matter is incorporated by reference herein.

Mercapto acids of type III

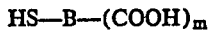

may contain 1 or 2 carboxy groups and up to 18 carbon atoms. The synthesis of such mercapto acids is described in: Houben-Weyl, Methoden der Organischen Chemie, Volume IX, pages 7 to 42 (Georg Thieme Verlag, Stuttgart).

While mercapto acids with up to 20 carbon atoms are useful for the synthesis of the novel $R_f$-acids, the following mercapto acids or their esters supplied by Evans Chemetrics, Inc., Darien, Conn. and/or Carlisle Chemical Works, Inc., Reading, Ohio are of special interest because of their commercial availability:

ESTERS OF MERCAPTO ACIDS n-butyl 3-mercaptopropionate: HS—CH$_2$CH$_2$COOC$_4$H$_9$
n-butyl thioglycolate: HS—CH$_2$COOC$_4$H$_9$
n-dodecyl 3-mercaptopropionate:
    HS—CH$_2$CH$_2$COOC$_{12}$H$_{25}$
n-dodecyl thioglycolate: HS—CH$_2$COOC$_{12}$H$_{25}$
ethyl thioglycolate: HS—CH$_2$COOC$_2$H$_5$
isoctyl thioglycolate: HS—CH$_2$COOC$_8$H$_{17}$
isoctyl 3-mercaptopropionate: HS—CH$_2$CH$_2$COOC$_8$H$_{17}$
methyl 3-mercaptopropionate: HS—CH$_2$CH$_2$COOCH$_3$
methyl thioglycolate: HS—CH$_2$COOCH$_3$
octadecyl 3-mercaptopropionate:
    HS—CH$_2$CH$_2$COOC$_{18}$H$_{37}$
octadecyl thioglycolate: HS—CH$_2$COOC$_{18}$H$_{37}$
tridecyl thioglycolate: HS—CH$_2$COOC$_{13}$H$_{27}$
triedcyl 3-mercaptopropionate: HS—CH$_2$CH$_2$COOC$_{13}$H$_{27}$

MERCAPTO ACIDS thioglycolic acid: HSCH$_2$COOH
thiolactic acid (or 2-mercaptopropionic acid):
    HSCH(CH$_3$)COOH
thiomalic acid:

Other mercapto acids described in Houben-Weyl or offered by fine chemical houses are:

o,m, and p-thiobenzoic acid: HS—C$_6$H$_5$COOH
2,2-diphenyl-4-mercaptobutyric acid:
    HSCH$_2$CH$_2$C(C$_6$H$_5$)$_2$COOH
5-mercaptovaleric acid: HS—(CH$_2$)$_4$COOH
4-mercaptobutyric acid: HS—(CH$_2$)$_3$COOH
2-mercapto-3-phenylpropionic acid:
    C$_6$H$_5$CH$_2$CH(SH)COOH
2-mercaptolauric acid: CH$_3$(CH$_2$)$_9$CH(SH)COOH The novel $R_f$-acids of type I can be converted into esters and anhydrides, employing well known synthesis techniques as in the following examples:

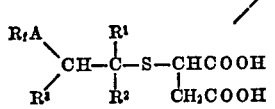

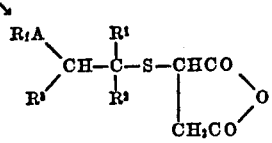

In the case of making $R_f$-esters of the novel $R_f$-acids of type I, it is preferable to add esters of the mercapto acids of type III to α,β-unsaturated esters of type II to avoid transesterification side reactions:

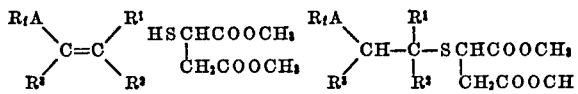

All novel $R_f$-acids of type I and esters or anhydrides thereof are characterized by having at least one pair or a triplet of closely packed $R_f$-groups in each molecule. This is a most important fact since polycondensation products derived from these novel $R_f$-acids will show, due to the close packing of the $R_f$-groups, significantly higher oil repellency ratings than condensation products derived from diacids containing just one $R_f$-group.

The addition of mercapto acids of type III to α,β-unsaturated di- and triesters of type II is accomplished either by a base or free radical catalysis.

The base catalyzed addition reaction of mercaptans to α,β-unsaturated esters is well known and described in detail in: Houben-Weyl, Methoden der Organischen Chemie, Volume 9, pages 123 to 126 (Georg Thieme Verlag, Stuttgart, 1955).

The preferred bases recommended for such addition reactions, in amounts from 0.01 to 2% at temperatures varying from room temperatures to 100° C., are generally strong inorganic or organic bases such as:

Sodium or potassium methoxide or ethoxide, benzyltrimethylammonium hydroxide, piperidine, or pyridine.

It was found, however, that the mercapto acids or esters can be added to α,β-unsaturated di- and triesters of type II with very weak organic bases such as tertiary amines, as for instance:

| | |
|---|---|
| triethylamine | tetramethyl-1,4-butanediamine |
| N-methylmorpholine | |
| triethylenediamine | diethylcyclohexylamine |
| N,N-dimethylpiperazine | dimethylethanolamine |
| N-ethylmorpholine | dimethylethylamine |
| | diethylmethylamine |

The use of such weak bases has many advantages such as the reduced formation of colored byproducts, the possibility of leaving the weak base in the final product, simplification of work-up procedures and reduction of costs; little or no reaction occures with solvents sensitive toward strong bases such as ketones or esters.

It is also possible to use free radical initiators of U.V. light for the addition of mercapto acids of type III to di- and triesters of type II. This is posisble because the di- or triesters of type II are in contrast to acrylic esters, very reluctant toward homopolymerization. A suitable catalyst may be any one of the commonly known agents for initiating the polymerization of vinyl monomers such as azoinitiators, (e.g. azobisisobutyronitrile) or aliphatic and aromatic acyl peroxides, e.g. decanoyl peroxide, lauroyl peroxide, benzoyl peroxide, dialkyl peroxides, e.g. t-butyl peroxide, cumyl peroxide; or hydroperoxides, e.g. t-butylhydroperoxide, cumen hydroper oxide, or peresters and peroxycarbonates, e.g. t-Butyl perbenzoate.

The use of base catalysis yields strictly adducts of formula I

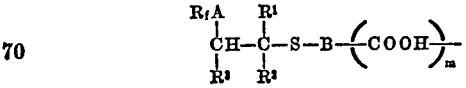

i.e. *one* α,β-unsaturated ester double bond reacts with one mercapto group. The use of free radical initiators yields also mainly adducts of formula I above, due to the reluctance of the di- and triesters to homopolymerize. However, it is unavoidable that a small percentage of oligomers of formula IV is formed:

IV
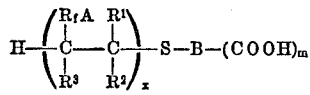

wherein X=2 to 10.

It is for this reason that the use of base catalysis is preferred over the use of free radical catalysis.

The addition of the mercapto acids to the di- and triesters of type II is usually carried out in a solvent in which the reactants and preferably also the adduct are soluble at the reaction temperature employed. Suitable solvents are aliphatic or aromatic hydrocarbons such as heptane, benzene, toluene, etc.; chlorinated or fluorinated aliphatic or aromatic hydrocarbons such as methylene chloride, chloroform, methyl chloroform, carbon tetrachloride, trichloroethylene, perchloroethylene, Freon's such as 1,1,2-trifluoro-1,2,2-trichloroethane, etc. chlorobenzene, benzotrifluoride or hexafluoroxylene, ketones, esters and ethers such as acetone, methyl isobutyl ketone, ethyl acetate and higher homologs, dialkyl ethers, tetrahydrofuran, ethylene glycol monomethyl or monoethyl ether, ethylene glycol dimethyl or diethyl ether, and mixtures of these ketones, esters or esters with water.

The addition reaction is very simple to carry out, i.e. the mercapto acids III, the di- or triester II are dissolved at the desired molar ratios in a solvent described above and the catalyst (0.01–2%) is added. The reaction mixture is kept at a temperature ranging from room temperature to 100° C., preferably under nitrogen until the disappearance of the double bond of the ester II indicates that the reaction is complete. Other means of following the reaction are GC (gas chromatography), titration of free mercapto groups or TLC (thin layer chromatography). Required reaction times depend on reaction temperatures and amounts and kind of catalysts employed and may range from 5 minutes to 24 hours. To obtain products free of discoloration it is preferred to work at reaction temperatures below 70° C., preferably 40 to 60° C. If required, the addition product can be isolated by evaporating the solvent and catalyst (low volatile catalysts such as triethylamine are preferred) and be purified employing crystallization, precipitation or distillation procedures.

In the following section showing the synthesis of the novel compounds of this disclosure, the mercapto acids are commercially available while the $R_f$-esters of type II are tabulated in Table I.

TABLE I
$R_f$-esters of Type II employed for the synthesis of $R_f$-acids

| Ex. | Name | Structure | Ref. |
|---|---|---|---|
| A | Bis(1,1-dihydroperfluorooctyl) fumarate, M.P. 80–82.5° C. | =CHCOOCH$_2$C$_7$F$_{15}$)$_2$, trans | Ser. No. 720,390, Ex. 2. |
| B | Bis(1,1,2,2-tetrahydroperfluorodecyl) fumarate, M.P. 81–83.5° C. | =CHCOOCH$_2$CH$_2$C$_8$F$_{17}$)$_2$, trans | Ser. No. 720,370. |
| C | Bis(1,1,2,2-tetrahydroperfluoroalkyl) fumarate, see Table I(b) | =CHCOOCH$_2$CH$_2$R$_f$)$_2$ trans—R$_f$=—C$_6$F$_{13}$,—C$_8$F$_{17}$,—C$_{10}$F$_{21}$ | Ser. No. 720,370. |
| D | Bis(1,1-dihydroperfluorooctyl) itaconate, B.P. 128–131° C. at 0.1 mm. | CH$_2$=C(CH$_2$COOCH$_2$C$_7$F$_{15}$)COOCH$_2$C$_7$F$_{15}$ | Ser. No. 720,370, Ex. 8 |
| E | Bis(1,1,2,2-tetrahydroperfluorononyl) thiofumarate M.P. 137.5–139° C. | =CHCOSCH$_2$CH$_2$C$_7$F$_{15}$)$_2$, trans | Ser. No. 720,370, Ex. 6. |
| F | Bis[4-(perfluoroheptyl)-3-butenyl]fumarate, B.P. 182° at 0.4 mm. | =CHCOOCH$_2$CH$_2$CH=CHC$_7$F$_{15}$)$_2$, trans | CIP/GC 309, FCR, 27 |
| G | Bis[6-(perfluoroheptyl)-3-oxa-5-hexenyl] itaconate, B.P. 208–216 at 0.8 mm. | CH$_2$=CCOOCH$_2$CH$_2$OCH$_2$CH=C$_7$F$_{15}$<br>CH$_2$COOCH$_2$CH$_2$OCH$_2$CH=CHC$_7$F$_{15}$ | CIP/GC 309, FCR, 27. |
| H | Bis[6-perfluorooctyl)-4-thiahexyl]fumarate, M.P. 81–83° C. | =CHCOOCH$_2$CH$_2$CH$_2$SCH$_2$CH$_2$C$_8$F$_{17}$)$_2$, trans | CIP/GC 309, FCR, 26. |
| I | Bis(4-perfluoroisopropoxy-1,1,2,2-tetra ydroperfluorobutyl) fumarate, B.P. 110° C. at 0.2 mm. | =CHCOOCH$_2$CH$_2$CF$_2$OCF(CF$_3$)$_2$]$_2$, trans | CIP/GC 309, FCR, 27. |
| J | Bis[2-(n-perfluorooctan amido)ethyl]fumarate M.P. 151–152.5° C. | =CHCOOCH$_2$CH$_2$NHCOC$_7$F$_{15}$)$_2$, trans | Ser. No. 732,040, Ex. 1. |
| K | Bis[2-(N-ethyl-n-perfluorooctanesulfonamido)ethyl] itaconate M.P. 99.5–100.5° C. | CH$_2$=CCOOCH$_2$CH$_2$N(C$_2$H$_5$)SO$_2$C$_8$F$_{17}$<br>CH$_2$COOCH$_2$CH$_2$N(C$_2$H$_5$)SO$_2$C$_8$F$_{17}$ | Ser. No. 812,349, Ex. 5. |
| L | Bis[2-(N-ethyl-n-perfluorooctanesulfonamido)ethyl] fumarate M.P. 112–112.5° C. | =CHCOOCH$_2$CH$_2$N(C$_2$H$_5$)SO$_2$C$_8$F$_{17}$]$_2$, trans | Ser. No. 812,349, Ex. 1. |
| M | Bis(N-1,1-dihydroperfluorooctyl) itaconamide, M.P. 142–143° C. | CH$_2$=CCONCH$_2$C$_7$F$_{15}$<br>CH$_2$CONCH$_2$C$_7$F$_{15}$ | Ser. No. 820,647, Ex. 5. |
| N | Bis(1,1-dihydrotrifluoroethyl) fumarate | =CHCOOCH$_2$CF$_3$]$_2$, trans | |
| O | Bis(1-hydrohexafluoroisopropyl) fumarate | =CHCOOCH(CF$_3$)$_2$]$_2$, trans | Serial No. 720,370. |

TABLE I-b—COMPOSITION AND ANALYSIS OF R$_f$-FUMARATE EXAMPLE C

The R$_f$-fumarate mixture of the type

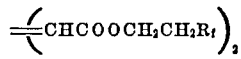

trans, derived from a mixture of R$_f$CH$_2$CH$_2$I, where R$_f$=C$_6$F$_{13}$, —C$_8$F$_{17}$ and —C$_{10}$F$_{21}$, is an off-white wax, and has the following composition according to GC analysis:

Diester-Content

C$_{12}$-diester: 3.5% (=—C$_6$F$_{13}$+—C$_6$F$_{13}$)
C$_{14}$-diester: 21.7% (=—C$_6$F$_{13}$+—C$_8$F$_{17}$)
C$_{16}$-diester: 38.8% (=—C$_6$F$_{13}$+—C$_{10}$F$_{21}$ and —C$_8$F$_{17}$+—C$_8$F$_{17}$)
C$_{18}$-diester: 27.6% (=—C$_8$F$_{17}$+—C$_{10}$F$_{21}$)
C$_{20}$-diester: 8.0% (=—C$_{10}$F$_{21}$+—C$_{10}$F$_{21}$)
Unknowns: 0.4%
Average Mol. Weight: 987.3
Fluorine Content: 63.91%
Boiling Range: 150 to 220° C. at 0.01 mm. Hg
Melting Range: 66 to 75° C.

EXAMPLE 1

3-[1,2-bis(1,1,2,2-tetrahydroperfluoroalkoxycarbonyl)ethylthio]propionic acid

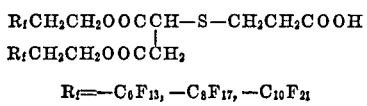

Bis(1,1,2,2 - tetrahydroperfluoroalkyl) fumarate (1010 g., 1.0 mole, Example C), 3-mercaptopropionic acid (111.4 g., 1.05 moles, Evans), 625 ml. tetrahydrofuran and 10 g. of triethylamine were charged into a 2 liter, 3-neck flask equipped with stirrer, thermometer, nitrogen inlet, reflux condenser protected by a Drierite guard tube. The mixture was heated to reflux (70–75° C.) for 20 hours after which time IR analysis showed complete reaction (disappearance of R$_f$-fumarate C=C double bond at 1312 cm.$^{-1}$). The yellow solution was slowly poured into 6250 ml. of ice cooled heptane causing the product to precipitate as a fine, off-white powder. The precipitate was filtered, washed three times with 500 ml. of heptane, and air dried. After high vacuum drying overnight, a total of 1017.8 g. (91.3% of theory) of adduct was obtained as an off-white, granular wax with a melting point of 65–77° C.

Analysis Found: C, 29.30; H, 1.56; F, 57.8
Molecular Weight Found: 1022 (by acid number determination)

To determine the composition of the perfluoroalkyl groups, the above acids were esterified with diazomethane and the composition of the resulting methyl esters determined by gas chromatography, using a pure C$_8$F$_{17}$-analog (as shown in Example 5) as internal standard. The following R$_f$-diester composition was found (area percent):

C$_{12}$-diester: 5.0% (=—C$_6$F$_{13}$+—C$_6$F$_{13}$)
C$_{14}$-diester: 22.8% (=—C$_6$F$_{13}$+—C$_8$F$_{17}$)
C$_{16}$-diester: 38.6% (=—C$_6$F$_{13}$+C$_{10}$F$_{21}$ and —C$_8$F$_{17}$+C$_8$F$_{17}$)
C$_{18}$-diester: 24.2% (=—C$_8$F$_{17}$+C$_{10}$F$_{21}$)
C$_{20}$-diester: 6.6% (=—C$_{10}$F$_{21}$+—C$_{10}$F$_{21}$)

EXAMPLE 2

2-[1,2-bis(1,1,2,2-tetrahydroperfluoroalkoxycarbonyl)ethylthio]succinic acid

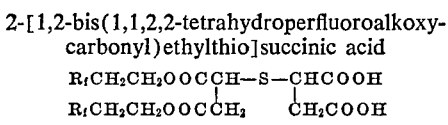

Bis(1,1,2,2 - tetrahydroperfluoroalkyl) fumarate (800 g., 0.792 moles, Example C), thiomalic acid (122 g., 0.81 moles, Evans), 600 ml. of ethyl acetate and 200 ml. of trifluorotoluene were refluxed at 85 to 90° under conditions as described in Example 1 for 20 hours, after which time reaction was complete based on the disappearance of the R$_f$-fumarate double bond. The turbid, light yellow solution was slowly poured while still hot into 4000 ml. of heptane (10° C.) under vigorous stirring, which caused the adduct to precipitate. The precipitate was filtered and washed three times with 250 ml. of heptane to yield 827 g. (90% yield) of a white, granular product with a melting point of 118–121° C.

Analysis Found: F, 56.01%
Molecular Weight Found: 1068 (by acid number determination)

As in Example 1, the perfluoroalkyl group composition was determined by gas chromatography after esterification with diazomethane, using as internal standard a pure C$_8$F$_{17}$-analog (as shown in Example 6).

Composition Found:

C$_{12}$-diester: 12.4% (=—C$_6$F$_{13}$+—C$_6$F$_{13}$)
C$_{14}$-diester: 28.9% (=—C$_6$F$_{13}$+—C$_8$F$_{17}$)
C$_{16}$-diester: 34.2% (=—C$_6$F$_{13}$+—C$_{10}$F$_{21}$ and —C$_8$F$_{17}$+—C$_8$F$_{17}$)
C$_{18}$-diester: 18.1% (=—C$_8$F$_{17}$+—C$_{10}$F$_{21}$)
C$_{20}$-diester: 2.1% (=—C$_{10}$F$_{21}$+—C$_{10}$F$_{21}$)

EXAMPLE 3

2-[1,2-bis(1,1,2,2-tetrahydroperfluoroalkoxycarbonyl)ethylthio]succinic anhydride

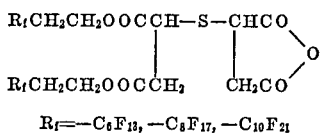

2 - [1,2 - bis(1,1,2,2-tetrahydroperfluoroalkoxycarbonyl)ethylthio]succinic acid (227.5 g., 0.2 moles, Example 2), and 500 ml. of methyl isobutyl ketone were charged into a 1000 ml. flask and warmed up to 45–50° C. At this temperature, trifluoroacetic anhydride (84.0 g., 0.4 moles) was added dropwise over a period of 15 minutes. The reaction mixture was kept at 50° C. for 3 hours after which time solvent and excess reactant were removed in vacuo, leaving an oily product which was dissolved in 200 ml. chloroform and then poured into 2500 ml. heptane. The anhydride precipitated as an off-white powder, which was filtered, washed three times with 100 ml. of heptane and dried, yielding 192.6 g. (85.9% yield) of an off-white powder with a melting point range of 63–118° C.

Analysis Found: C, 29.35; H, 1.27; F, 56.84

EXAMPLE 4

2-[1,2-bis(1,1,2,2-tetrahydroperfluoroalkoxycarbonyl)ethylthio]acetic acid

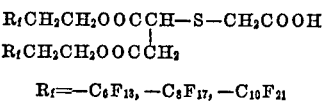

Example 1 was repeated, but mercaptoacetic acid instead of 3-mercaptopropionic acid was employed. A similar granular, off-white powder in 56% yield was obtained with a melting point of 51–65° C.

Analysis Found: C, 29.30; H, 1.56; F, 57.8.
Molecular Weight Found: 1022 (Titration).

EXAMPLE 5

3-[1,2-bis(1,1,2,2-tetrahydroperfluorodecoxycarbonyl)ethylthio]propionic acid

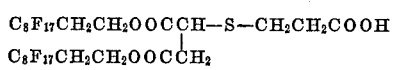

Bis(1,1,2,2 - tetrahydoperfluorodecyl) fumarate (10.08 g., 0.01 mole, Example B), 3-mercaptopropionic acid (1.11 g., 0.0105 mole), triethylamine (0.10 g.) and methyl chloroform (44 g.) were charged into a 3 neck flask equipped with a condenser, nitrogen inlet, thermometer and magnetic stirrer. The reactants were heated to 65° C. overnight after which time the reaction was complete according to VPC and IR analyses. The solvent was stripped off and the residue was crystallized two times from carbon tetrachloride. The molecular weight of the white powder which was isolated was 1140 (theoretical 1114) as determined by KOH titration. The product (9.6 g). was triturated with 20 ml. of chloroform. A small amount of insoluble material (0.4 g.) was removed; the solution was then diluted with 20 ml. of carbon tetrachloride and 7.7 g. of the pure product crystallized out, m.p. 73–80° C. The NMR showed proton resonances at: $\delta$ 2.1–3.1, 10 protons in complex overlapping signals, —COCH$_2$CH$_2$S—, R$_f$CH$_2$— X2, —SCH$\underline{CH_2}$COO—; $\delta$ 3.68, 1 proton in overlapping doublets, —S$\underline{CH}$CH$_2$—; $\delta$ 4.4, 4 protons in a multiplet, —O$\underline{CH_2}$CH$_2$R$_f$ X2; $\delta$ 10.2, 1 proton in a broad singlet —COOH.

These data are consistent with the above structure.

Analysis for C$_{27}$H$_{16}$F$_{34}$O$_6$S.—Calculated: C, 29.10; H, 1.45; F, 57.97. Found: C, 30.69; H, 1.74; F, 56.35.

EXAMPLE 6

2-[1,2-bis[1,1,2,2-tetrahydroperfluorodecoxycarbonyl)ethylthio]succinic acid

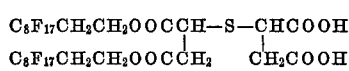

Bis(1,1,2,2 - tetrahydroperfluorodecyl) fumarate (30.24 g., 0.03 mole, Example B), thiomalic acid (4.96 g., 0.333 moles), triethylamine (0.35 g.) and 100 ml. tetrahydrofuran were refluxed for 24 hours and the reaction product worked up as described in Example 1. The crude product, an off-white powder was crystallized from a chloroform-acetone mixture yielding 17.5 g. (50.5%) of a white powder with a m.p. of 135–136° C. The NMR showed porton resonances at $\delta$ 2.2–3.3, 8 protons in complex overlapping multiplets, (R$_f$$\underline{CH_2}$CH$_2$) x 2 and

$\delta$ 4.05, 2 protons in overlapping multiplets

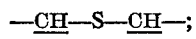

$\delta$ 4.48, 4 protons in overlapping triplets $\delta$ 5.8, 2 protons in a broad singlet, (COOH) x 2. These data are consistent with the above structure.

Analysis for C$_{28}$H$_{16}$F$_{34}$O$_8$S.—Calculated: C, 29.03; H, 1.39; F, 55.76. Found: C, 28.99; H, 1.55; F, 56.21.

EXAMPLE 7

2-[1,2-bis(1,1,2,2-tetrahydroperfluorodecoxycarbonyl)ethylthio]succinic anhydride

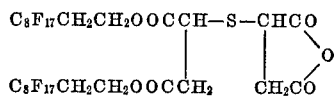

2 - [1,2 - bis(1,1,2,2 - tetrahydroperfluorodecoxycarbonyl)ethylthio]succinic acid (3.47 g., 0.003 moles, Example 7) phosphorus pentoxide (0.43 g., 0.003 moles) and toluene (25 ml., spectograde) were refluxed in a flask for 17 hours. A brown insoluble gum was obtained; the hot toluene solution was decanted through fluted filter paper. 20 g. of warm tetrahydrofuran was added to prevent the product from crystallizing out during the filtration. Then, the filtered solution was cooled and the product crystallized out. The solid was filtered and then recrystallized from chloroform. The purified anhydride (2.25 g., m.p. 92–92° C.) was obtained in a 66% yield. The IR scan showed the characteristic bands for an anhydride (1860 cm.$^{-1}$, 1780 cm.$^{-1}$). The NMR showed proton resonances at $\delta$ 1.5, 2 protons in overlapping doublets CH—$\underline{CH_2}$COO;

$\delta$ 1.7–2.8, 6 protons in unresolved signals, CF$_2$$\underline{CH_2}$CH$_2$ x 2 and —CH$\underline{CH_2}$COO; $\delta$ 2.8–3.7, 2 protons in complex unresolved signals, —$\underline{CH}$—S—$\underline{CH}$—; $\delta$ 4.0, 4 protons in overlapping triplets.

These data are consistent for the above structure.

Analysis for C$_{28}$H$_{14}$F$_{34}$O$_7$S.—Calculated: C, 29.49; H, 1.24; F, 56.04. Found: C, 29.34; H, 1.29; F, 56.79.

EXAMPLE 8

Dimethyl 2-[1,2-bis(1,1,2,2-tetrahydroperfluorodecoxycarbonyl)ethylthio]succinate

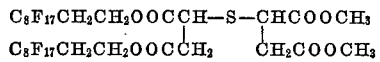

2 - [1,2-bis(1,1,2,2 - tetrahydroperfluorodecoxycarbonyl)ethylthio]succinic acid (2.32 g., 0.002 moles, Example 7) was dissolved in tetrahydrofuran (50 ml., spectro quality). The solution was cooled to 15° C., then an ethereal solution of diazomethane, prepared according to the procedure in Org. Synthesis Col. Vol. III, 165 (1943), was added dropwise until a yellow color persisted. The clear solution was allowed to stand for a few hours before the solvent was evaporated. A colorless wax (2.37 g.) was obtained, m.p. 50–52° C. A VPC analysis showed one peak; an IR scan did not show any evidence of a carboxylic acid. The NMR showed proton resonances at $\delta$ 2.0–3.1, 8 protons in broad unresolved and overlapping signals, CF$_2$$\underline{CH_2}$CH$_2$ x 2, and $\underline{CH_2}$COO x 2; $\delta$ 3.8 and 3.9, 6 protons in 2 singlets, 2 x COO$\underline{CH_3}$; $\delta$ 4.05, 2 protons in overlapping multiplets, —CH—S—CH—; $\delta$ 4.50, 4 protons in overlapping triplets, $\underline{CH_2}$O x 2. These data are consistent for the above structure.

Analysis for C$_{30}$H$_{20}$F$_{34}$O$_8$S.—Calculated: C, 30.37; H, 1.70; F, 54.44. Found: C, 30.61; H, 1.77; F, 54.69.

EXAMPLE 9

2-[1,2-bis[2-(N-ethyl-n-perfluorooctanesulfonamido) ethoxycarbonyl]ethylthio]succinic acid

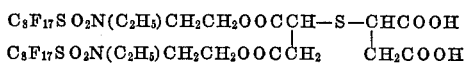

Bis[2 - (N - ethyl-n-perfluorooctanesulfonamido)ethyl] fumarate (12.22 g. 0.01 mole, Example L), thiomalic acid (1.65 g., 0.011 mole), triethylamine (0.27 g.) and 40 ml. tetrahydrofuran were refluxed for 44 hours after which time the $R_f$-fumarate C=C double bond had disappeared (IR, bond at 1312 cm.$^{-1}$) indicating complete reaction. The reaction mixture was poured into 500 ml. of water and a rubbery solid precipitated. Attempts to crystallize the precipitate from organic solvents failed. After high vacuum drying the precipitate, 12.0 g. (87.5% yield) of a tan powder with a m.p. of 89–94° C. was obtained.

The NMR showed proton resonances at δ 0.7 to 1.7, 6 protons in a broad signal, 2 x CH$_3$—; δ 2.2 to 5.5, 18 protons in a broad unresolved signal, 2X—NCH$_2$CH$_2$—O, 2X—NCH$_2$CH$_3$, 2X—S—CH—CH$_2$; δ 11.1 2 protons in a broad singlet 2X—COOH. The above data are consistent for the structure above.

Analysis for $C_{32}H_{26}F_{34}N_2O_{12}S_3$.—Calculated: C, 28.00; H, 1.91; F, 47.06; N, 2.04. Found: C, 27.92; H, 1.91; F, 46.34; N, 2.03. Molecular weight (KOH titration).—Calculated: 1372. Found: 1400.

EXAMPLE 10

3-[1,2-bis(1,1 dihydroperfluorooctoxycarbonyl) ethylthio]propionic acid

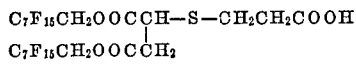

Bis(1,1 - dihydroperfluorooctyl) fumarate (20.0 g., 0.0227 moles, Example A), 3-mercaptopropionic acid (8.0 g., 0.0755 moles) 1 ml. triethylamine and 100 ml. methyl isobutyl ketone were charged into a reaction flask and kept for 18 hours at 55° C. The reaction mixture was then washed five times with 50 ml. of water to remove the excess 3-mercaptopropionic acid and dried by removing traces of water in the reaction mixture with benzene. After evaporating all solvents, the product was obtained as a yellow oil which could be distilled at 180–200° C. at 0.1 mm. Hg. A total of 8.7 g. (39% yield) of product was obtained which solidified at room temperature. The white crystalline solid had a m.p. of 46–49° C. The NMR showed proton resonances at 2.3–3.2, 6 protons in broad overlapping signals, —CO—CH$_2$—, —CHSCH$_2$CH$_2$—; δ 3.95, 1 proton as a triplet, —CH—; δ 4.8, 4 protons in multiplets of triplets, 2XC$_7$F$_{15}$CH$_2$—; δ 6.1, 1 proton as a broad singlet, —COOH. These data are consistent for above structure.

Analysis for $C_{23}H_{12}F_{30}O_6S$.—Calculated: C, 28.00; H, 1.23; F, 57.79. Found: C, 28.25; H, 1.34; F, 57.72.

EXAMPLE 11

Dodecyl 3-[1,2-bis(1,1,2,2-tetrahydroperfluorodecoxy-carbonyl)ethylthio]propionate

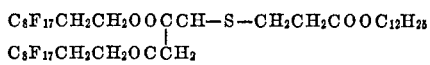

Bis(1,1,2,2-tetrahydroperfluorodecyl) fumarate (6.05 g., 0.006 moles, Example B), dodecyl 3-mercaptopropionate (1.645 g., 0.006 moles), triethylamine (0.07 g.) and methyl chloroform (30 g.) were charged into a flask and heated at 65° C. under a nitrogen atmosphere for 20 hours at which time TLC and IR analysis indicated a complete reaction. The solvent was stripped off leaving a white wax. This was crystallized from hexane yielding 6.5 g. (84.5% of theoretical yield) of a white brittle waxy solid, m.p. 46–47° C. The NMR showed proton resonances at δ 0.9, 3 protons in a triplet, CH$_3$CH$_2$—; δ 1.1–1.8′ 20 protons, undetermined multiplicity, CH$_3$—(CH$_2$)$_{10}$CH$_2$—O; δ 2.1–3.1, 10 protons overlapping multiplicities, COCH$_2$CH$_2$S, R$_f$CH$_2$COO—; δ 3.68, 1 proton in a multiplet,

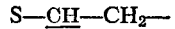

δ 4.10 2 protons in a triplet, C$_{10}$H$_{21}$—CH$_2$—CH$_2$—O; δ 4.41, 4 protons in a multiplet, —OCH$_2$—CH$_2$R$_f$·x 2. These data are consistent with the above structure.

Analysis for $C_{39}H_{40}F_{34}O_6S$.—Calculated: C, 36.51; H, 3.14; F, 50.36. Found: C, 36.77; H, 3.27; F, 50.40.

EXAMPLE 12

3-[1,2-bis(1,1-dihydrotrifluoroethoxycarbonyl) ethylthio]propionic acid

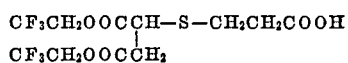

Bis(1,1-dihydrotrifluoroethyl) fumarate (5.6 g., 0.02 moles, Example N), 3-mercaptopropionic acid (2.5 g., 0.024 moles), triethylamine (0.1 g.) and 100 ml. ethyl acetate were sealed in an ampul under nitrogen and reacted at room temperature for three days, after which time the reaction mixture was washed with dilute hydrochloric acid, followed by water and dried over anhydrous magnesium sulfate. A total of 9.8 g. (93.7% yield) of an oil was obtained which was distilled at approximately 171–2° C. and 4 mm. Hg to yield 8.0 g. (76.5% yield) of a colorless oil. The NMR showed proton resonances at δ 2.52–3.22, 6 protons in overlapping multiplets, —CH$_2$—CHSCH$_2$CH$_2$COOH; δ 3.82, 1 proton in a doublet of doublets, —CH—S—; δ 4.48–4.55, 4 protons in a quartet and doublet of quartets 2 x CF$_3$CH$_2$—; δ 11.57, 1 proton singlet, —COOH. These data are consistent with the above structure.

Analysis for $C_{11}H_{12}F_6O_6S$.—Calculated: C, 34.20; H, 3.13; F, 29.51. Found: C, 34.40; H, 3.15; F, 29.55.

EXAMPLE 13

3-[1,2-bis(1-hydrohexafluoroisopropoxycarbonyl) ethylthio]propionic acid

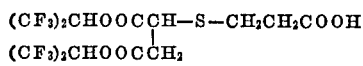

Bis(1-hydrohexafluoroisopropyl) fumarate (8.3 g., 0.02 moles, Example O), 3-mercaptopropionic acid (2.5 g., 0.024 moles), triethylamine (0.1 g.) and 100 ml. ethylacetate were reacted and the reaction mixture worked up as described in Example 13. Distillation of the end product at 150° C. and 0.3 mm. Hg yielded 6.4 g. (83.5% yield) of a pale colored oil. The NMR showed proton resonances at δ 2.50–3.33, 6 protons in complex overlapping multiplets, —CH$_2$CHSCH$_2$CH$_2$COOH; δ 3.90, 1 proton in a doublet of doublets, —CHSCH$_2$CH$_2$COOH; δ 5.78, 2 protons in a doublet of heptets, 2 x

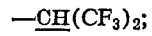

δ 11.68, 1 proton singlet, —COOH.

These data are consistent with the structure of the compound.

Analysis for $C_{13}H_{10}F_{12}O_6S$.—Calculated: C, 29.89; H, 1.93; F, 43.66. Found: C, 29.85; H, 1.87; F, 43.42.

EXAMPLES 14–23

Novel $R_f$-acids of type I as listed in Table II are prepared by reacting the listed esters of type II with equimolar amounts of mercapto acids of type III or esters thereof employing conditions as described in Example 1.

TABLE II

| Example | Ester of Type II | Mercapto Acid Type III or esters thereof | R_f-acids of Type I, or esters thereof |
|---|---|---|---|
| Example 14 | (CHCOOCH$_2$CH$_2$R$_f$)$_2$ — Example C | + HSCH(CH$_3$)COOH | → R$_f$CH$_2$CH$_2$OOCCH—S—CH(CH$_3$)COOH<br>R$_f$CH$_2$CH$_2$OOCCH$_3$ |
| 15 | CH$_2$=CCOOCH$_2$C$_7$F$_{15}$<br>CH$_2$COOCH$_2$C$_7$F$_{15}$ — Example D | + HSCHCOOH<br>CH$_2$COOH | → C$_7$F$_{15}$CH$_2$OOCCHCH$_2$—S—CHCOOH<br>C$_7$F$_{15}$CH$_2$OOCCH$_3$  CH$_2$COOH |
| 16 | (CHCOSCH$_2$CH$_2$C$_7$F$_{15}$)$_2$ — Example E | + HSCH$_2$COOH | → C$_7$F$_{15}$CH$_2$CH$_2$SOCCH—S—CH$_2$CH$_2$COOH<br>C$_7$F$_{15}$CH$_2$CH$_2$SOCCH$_3$ |
| 17 | (CHCOOCH$_2$CH$_2$CH=CHC$_7$F$_{15}$)$_2$ — Example F | + HSCH$_2$COOH | → C$_7$F$_{15}$CH=CHCH$_2$CH$_2$OOCCHCH$_2$—S—CH$_2$COOH<br>C$_7$F$_{15}$CH=CHCH$_2$CH$_2$OOCCH$_3$ |
| 18 | CH$_2$=CCOOCH$_2$CH$_2$OCH$_2$CH=CHC$_7$F$_{15}$<br>CH$_2$COOCH$_2$CH$_2$OCH$_2$CH=CHC$_7$F$_{15}$ — Example G | + HSCH$_2$COOC$_2$H$_5$ | → C$_7$F$_{15}$CH=CHCH$_2$OCH$_2$CH$_2$OOCCHCH$_2$—S—CH$_2$COOC$_2$H$_5$<br>C$_7$F$_{15}$CH=CHCH$_2$OCH$_2$CH$_2$OOCCH$_3$ |
| 19 | (CHCOOCH$_2$CH$_2$CH$_2$SCH$_2$CH$_2$C$_8$F$_{17}$)$_2$ — Example H | + HSCHCOOH<br>CH$_2$COOH | → C$_8$F$_{17}$CH$_2$CH$_2$SCH$_2$CH$_2$CH$_2$OOCCH—S—CHCOOH<br>C$_8$F$_{17}$CH$_2$CH$_2$SCH$_2$CH$_2$CH$_2$OOCCH$_3$  CH$_2$COOH |
| 20 | [CHCOOCH$_2$CH$_2$CF$_2$CF$_2$OCF(CF$_3$)$_2$]$_2$ — Example I | + HSCH$_2$CH$_2$COOH | → (CF$_3$)$_2$CFOCF$_2$CF$_2$CH$_2$CH$_2$OOCCH—S—CH$_2$CH$_2$COOH<br>(CF$_3$)$_2$CFOCF$_2$CF$_2$CH$_2$CH$_2$OOCCH$_3$ |
| 21 | (CHCOOCH$_2$CH$_2$NHCOC$_7$F$_{15}$)$_2$ — Example J | + HSCH$_2$CH$_2$COOC$_2$H$_5$ | → C$_7$F$_{15}$CONHCH$_2$CH$_2$OOCCH—S—CH$_2$CH$_2$COOC$_2$H$_5$<br>C$_7$F$_{15}$CONHCH$_2$CH$_2$OOCCH$_3$ |
| 22 | CH$_2$=CCOOCH$_2$CH$_2$N(C$_2$H$_5$)SO$_2$C$_8$F$_{17}$<br>CH$_2$COOCH$_2$CH$_2$N(C$_2$H$_5$)SO$_2$C$_8$F$_{17}$ | + HSCH$_2$COOC$_{18}$H$_{37}$ | → C$_8$F$_{17}$SO$_2$N(C$_2$H$_5$)CH$_2$CH$_2$OOCCHCH$_2$—S—CH$_2$COOC$_{18}$H$_{37}$<br>C$_8$F$_{17}$SO$_2$N(C$_2$H$_5$)CH$_2$CH$_2$OOCCH$_3$ |
| 23 | CH$_2$=CCONHCH$_2$C$_7$F$_{15}$<br>CH$_2$CONHCH$_2$C$_7$F$_{15}$ | + HSCH$_2$COOC$_{12}$H$_{25}$ | → C$_7$F$_{15}$CH$_2$NHCOCHCH$_2$—S—CH$_2$COOC$_{12}$H$_{25}$<br>C$_7$F$_{15}$CH$_2$NHCOCH$_3$ |

What is claimed is:
1. A carboxylic acid of the formula:

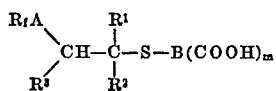

wherein
$R^1$ and $R^2$ and $R^3$ are hydrogen, methyl $R_fA$ or $R_fACH_2$ with the requirement that at least one or two of $R^1$, $R^2$ and $R^3$ represent $R_fA$ or $R_fACH_2$;
$R_f$ is a perfluoroalkyl group of 1 to 18 carbon atoms;
$R_fA$ is

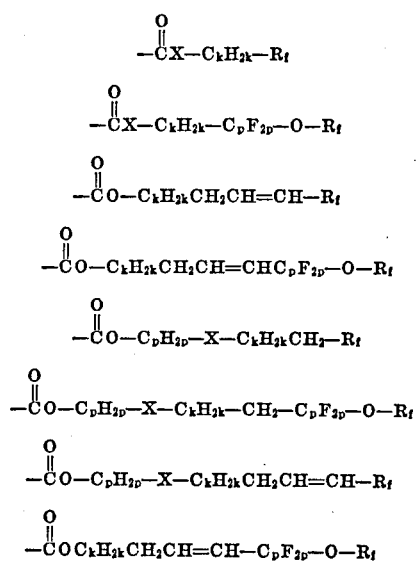

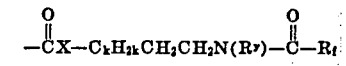

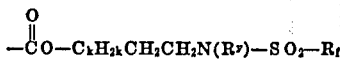

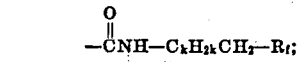

$x$ is oxygen or sulfur;
$k$ is zero to 10;
$p$ is 2 to 12;
$R^y$ is hydrogen or alkyl of 1 to 4 carbon atoms;
$m = 1$ or 2
B is

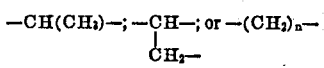

where $n$ is an integer from 1 to 4.
2. The acid of claim 1 wherein $R_f$ contains 6 to 12 carbon atoms,
3. The acid of claim 2 wherein X is oxygen.
4. The acid of claim 2 wherein X is sulfur.

References Cited
UNITED STATES PATENTS
3,445,491  5/1969  Pacini _____ 260—399
3,658,857  4/1972  Kleiner et al. _____ 260—402.5

ELBERT L. ROBERTS, Primary Examiner

U.S. Cl. X.R.
260—346.8, 481 R